US012694872B1

(12) United States Patent
Paiuk

(10) Patent No.: US 12,694,872 B1
(45) Date of Patent: Jul. 28, 2026

(54) VERIFYING COMPLIANCE OF VIDEO CONFERENCE PRESENTATION WITH SPECIFIED PARAMETERS

(71) Applicant: Zoom Communications, Inc., San Jose, CA (US)

(72) Inventor: Alejandro Martin Paiuk, West Hartford, CT (US)

(73) Assignee: Zoom Communications, Inc., San Jose, CA (US)

( * ) Notice: Subject to any disclaimer, the term of this patent is extended or adjusted under 35 U.S.C. 154(b) by 74 days.

(21) Appl. No.: 18/525,380

(22) Filed: Nov. 30, 2023

(51) Int. Cl.
| | |
|---|---|
| *G10L 15/183* | (2013.01) |
| *G06F 40/253* | (2020.01) |
| *G06V 20/50* | (2022.01) |
| *G06V 30/42* | (2022.01) |
| *G10L 15/30* | (2013.01) |
| *G10L 25/63* | (2013.01) |
| *H04L 65/403* | (2022.01) |

(52) U.S. Cl.
CPC ............ *G10L 15/183* (2013.01); *G06V 20/50* (2022.01); *G06V 30/42* (2022.01); *G10L 15/30* (2013.01); *G10L 25/63* (2013.01); *G06F 40/253* (2020.01); *H04L 65/403* (2013.01)

(58) Field of Classification Search
CPC ....... G10L 15/183; G10L 15/30; G10L 25/63; G10L 25/84; G06F 40/253; G06F 40/35; G06V 20/50; G06V 30/42; H04L 65/403
USPC ...................................... 704/9, 270
See application file for complete search history.

(56) References Cited

U.S. PATENT DOCUMENTS

| | | | |
|---|---|---|---|
| 9,026,915 B1 * | 5/2015 | Ehlen ................... | G06F 16/9538 |
| | | | 715/728 |
| 9,065,973 B2 | 6/2015 | Graham et al. | |
| 9,477,380 B2 | 10/2016 | Amijee | |
| 10,877,714 B2 | 12/2020 | Rajendran et al. | |
| 2017/0220535 A1 * | 8/2017 | Olsen ................... | G06F 40/166 |
| 2017/0316314 A1 * | 11/2017 | Mengle ................. | G06F 40/211 |
| 2019/0163745 A1 * | 5/2019 | Beller ..................... | G06F 40/51 |
| 2019/0318010 A1 * | 10/2019 | Tamir ...................... | G10L 15/07 |
| 2021/0399911 A1 * | 12/2021 | Jorasch ............... | H04L 12/1818 |
| 2022/0038580 A1 * | 2/2022 | Li ........................ | H04L 12/1818 |
| 2022/0141532 A1 * | 5/2022 | Li .......................... | G06V 40/174 |
| | | | 725/14 |
| 2022/0229832 A1 * | 7/2022 | Li ...................... | G06F 16/24578 |
| 2022/0303601 A1 * | 9/2022 | Zavesky ................. | H04W 4/44 |
| 2022/0366153 A1 * | 11/2022 | Li ...................... | G06F 16/24578 |
| 2022/0414315 A1 * | 12/2022 | Li .......................... | G06F 40/103 |
| 2024/0095463 A1 * | 3/2024 | Leary ...................... | G06F 40/20 |

(Continued)

*Primary Examiner* — James S Wozniak
(74) *Attorney, Agent, or Firm* — Young Basile Hanlon & MacFarlane, P.C

(57) ABSTRACT

A server receives, from a host device of a video conference, an identifier of a presenter device of the video conference and parameters for the video conference. The server receives, from the presenter device, at least one of presentation slides for the video conference or indicia of a trial performance of a presentation for the video conference. The server determines, using a language model, whether the at least one of the presentation slides or the indicia of the trial performance meet at least a subset of the parameters. The server transmits, to at least one of the host device or the presenter device, an output based on whether the at least one of the presentation slides or the indicia of the trial performance meet the at least the subset of the parameters.

20 Claims, 10 Drawing Sheets

600

(56)     References Cited

U.S. PATENT DOCUMENTS

| | | | |
|---|---|---|---|
| 2024/0126981 A1* | 4/2024 | Shahinian | G06F 40/40 |
| 2024/0193858 A1* | 6/2024 | Hylak | G06T 17/00 |
| 2024/0274025 A1* | 8/2024 | Vleugels | G09B 7/00 |
| 2024/0289628 A1* | 8/2024 | Parmar | G06F 40/30 |
| 2024/0304031 A1* | 9/2024 | Mishra | G06V 40/20 |
| 2024/0371089 A1* | 11/2024 | Yang | G06N 3/0455 |
| 2024/0378396 A1* | 11/2024 | Bhupati | G06F 40/20 |
| 2024/0378399 A1* | 11/2024 | Gandhi | G06F 40/40 |
| 2025/0021741 A1* | 1/2025 | Kumar | G06F 16/345 |
| 2025/0061270 A1* | 2/2025 | Wippich | G06F 40/166 |
| 2025/0131918 A1* | 4/2025 | Braganza | G10L 15/16 |

* cited by examiner

500

600

| HOST DEVICE 502 | SERVER 504 | PRESENTER DEVICE 506 |
| --- | --- | --- |

602

CONFERENCE INFO,
PRESENTER DEVICE
INFO, PARAMETERS

604

PRESENTATION
SLIDES

606

PRESENTATION TRIAL PERFORMANCE

608

PARAMETERS MET?

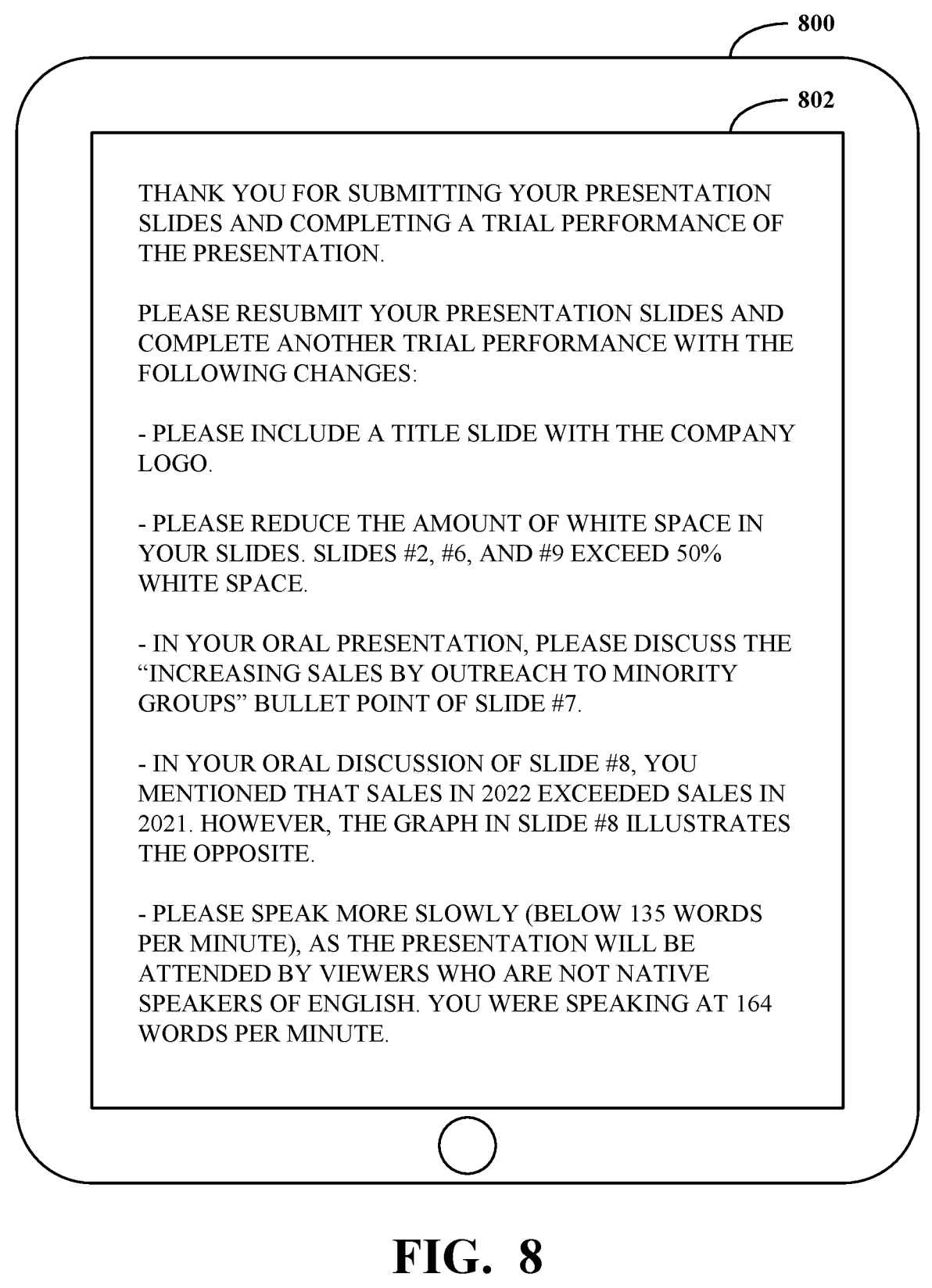

800

802

THANK YOU FOR SUBMITTING YOUR PRESENTATION SLIDES AND COMPLETING A TRIAL PERFORMANCE OF THE PRESENTATION.

PLEASE RESUBMIT YOUR PRESENTATION SLIDES AND COMPLETE ANOTHER TRIAL PERFORMANCE WITH THE FOLLOWING CHANGES:

- PLEASE INCLUDE A TITLE SLIDE WITH THE COMPANY LOGO.

- PLEASE REDUCE THE AMOUNT OF WHITE SPACE IN YOUR SLIDES. SLIDES #2, #6, AND #9 EXCEED 50% WHITE SPACE.

- IN YOUR ORAL PRESENTATION, PLEASE DISCUSS THE "INCREASING SALES BY OUTREACH TO MINORITY GROUPS" BULLET POINT OF SLIDE #7.

- IN YOUR ORAL DISCUSSION OF SLIDE #8, YOU MENTIONED THAT SALES IN 2022 EXCEEDED SALES IN 2021. HOWEVER, THE GRAPH IN SLIDE #8 ILLUSTRATES THE OPPOSITE.

- PLEASE SPEAK MORE SLOWLY (BELOW 135 WORDS PER MINUTE), AS THE PRESENTATION WILL BE ATTENDED BY VIEWERS WHO ARE NOT NATIVE SPEAKERS OF ENGLISH. YOU WERE SPEAKING AT 164 WORDS PER MINUTE.

FIG. 8

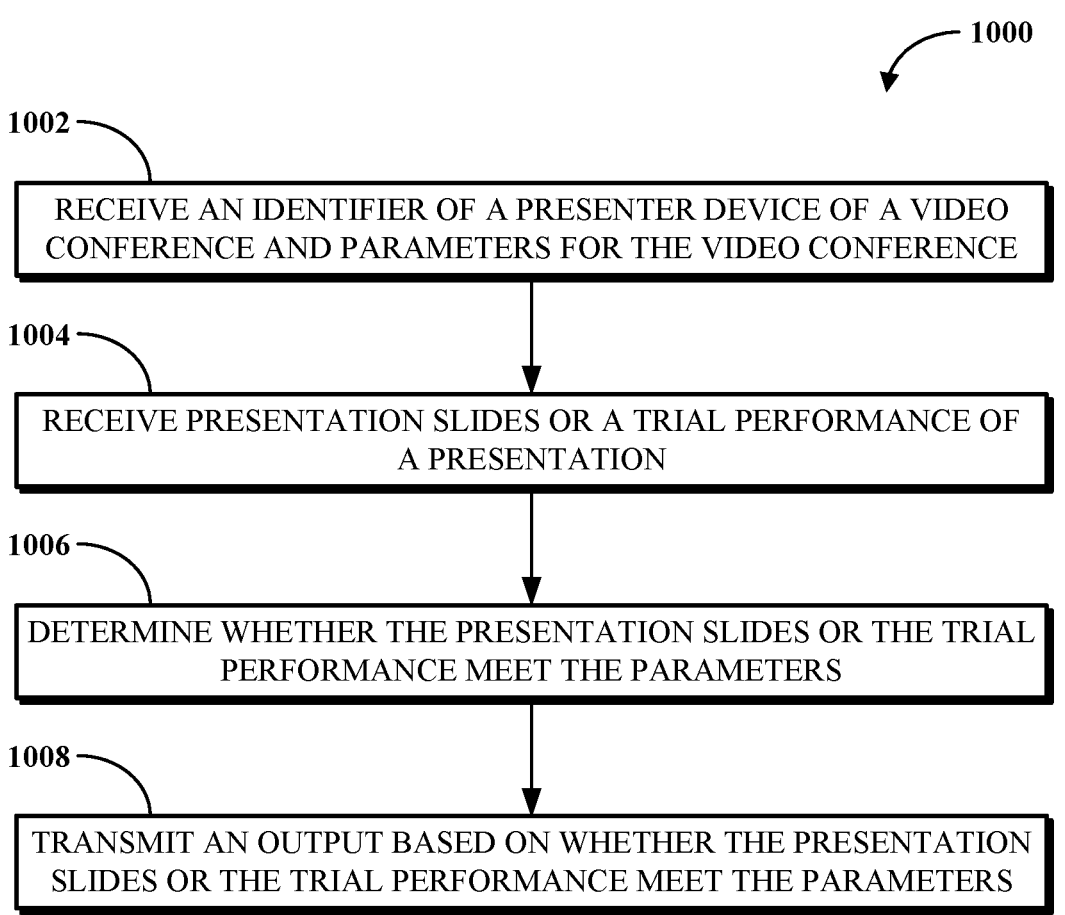

1000

1002
RECEIVE AN IDENTIFIER OF A PRESENTER DEVICE OF A VIDEO CONFERENCE AND PARAMETERS FOR THE VIDEO CONFERENCE

1004
RECEIVE PRESENTATION SLIDES OR A TRIAL PERFORMANCE OF A PRESENTATION

1006
DETERMINE WHETHER THE PRESENTATION SLIDES OR THE TRIAL PERFORMANCE MEET THE PARAMETERS

1008
TRANSMIT AN OUTPUT BASED ON WHETHER THE PRESENTATION SLIDES OR THE TRIAL PERFORMANCE MEET THE PARAMETERS

FIG. 10

VERIFYING COMPLIANCE OF VIDEO CONFERENCE PRESENTATION WITH SPECIFIED PARAMETERS

FIELD

This disclosure generally relates to video conferencing, and, more specifically, to verifying compliance of a video conference presentation with specified parameters. The parameters may be specified by the host of the video conference or by another entity.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 8 illustrates an example mobile device presenting a graphical user interface indicating noncompliance of a video conference presentation with specified parameters.

FIG. 10 is a flowchart of an example of a technique for verifying compliance of a video conference presentation with specified parameters.

DETAILED DESCRIPTION

Figure 1:
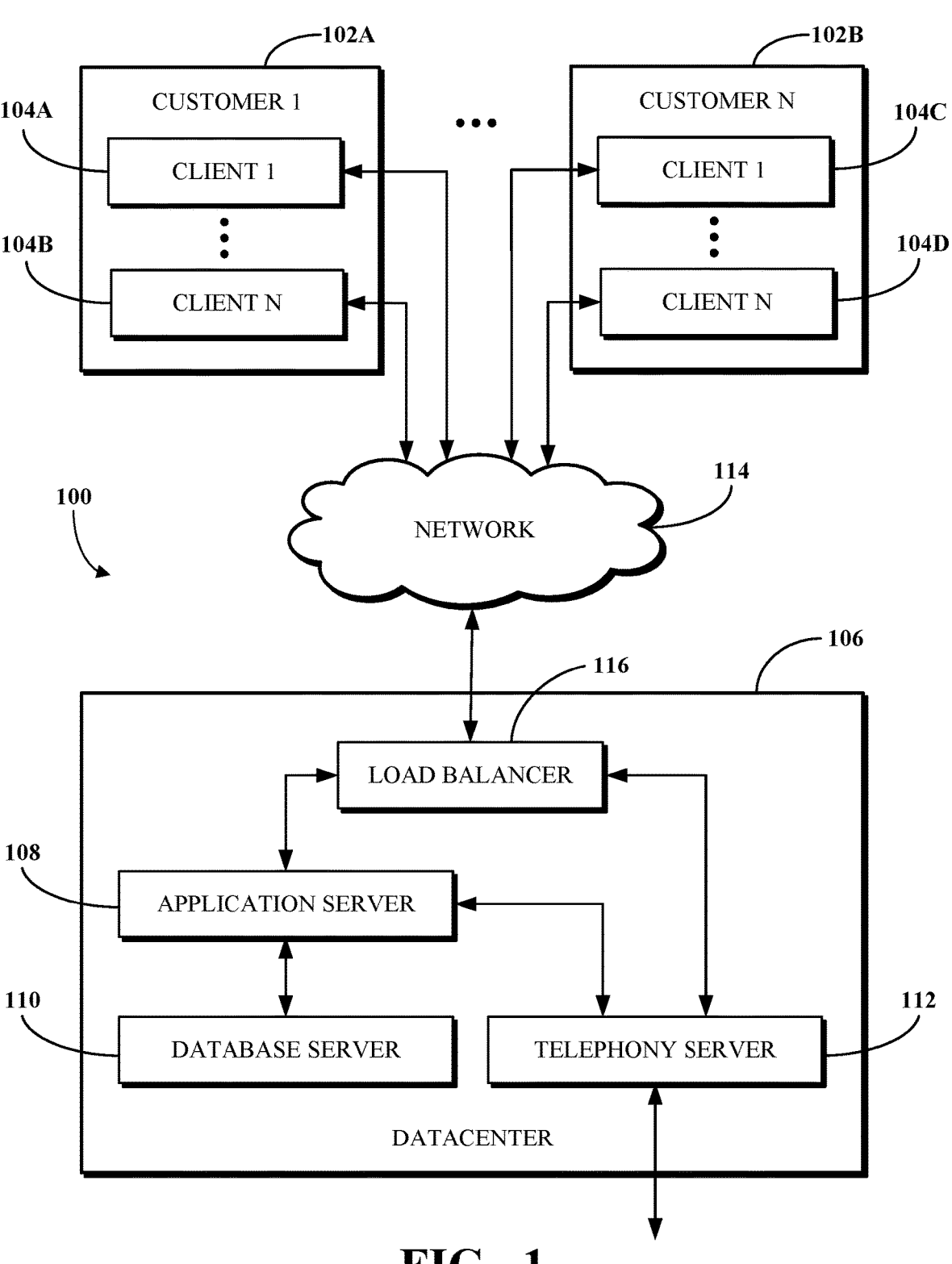
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

A video conference host may organize a video conference that includes multiple presentations by multiple presenters. For example, a video conference about investment may include a first presenter about stocks, a second presenter about bonds, and a third presenter about real estate. The video conference host may desire to ensure that each presenter meet certain parameters specified by the video conference host. For example, the parameters may include at least one of a time limit parameter, a parameter related to the slides, a parameter related to audio or video quality, or a parameter related to the content of the presenter's speech. In a specific but non-limiting example, the parameters may indicate that each slide of each presentation is to incorporate a company logo, and that the presentation about stocks is to last 25-30 minutes, the presentation about bonds is to last 15-20 minutes, and the presentation about real estate is to last 10-15 minutes. Having the parameters met may ensure the timeliness, internal consistency, and quality of the video conference. However, ensuring that the parameters are met may be challenging, as the host might need to manually review the slides and/or conduct multiple trial performances with the multiple presenters. Techniques for automatically ensuring that video conference presentations meet certain parameters may be desirable.

Implementations of this disclosure address problems such as these using artificial intelligence and/or rule-based computing techniques to verify that the presentation slides and/or a trial performance of a presentation meets certain parameters. A host of a video conference uses a host device to specify parameters for the presentations in a video conference. The parameters may be entered, via the host device, by accessing a graphical user interface (GUI), generated by the video conferencing software, for creating a future video conference. The GUI may be accessible via special purpose software executing at the host device (which communicates with a server) or via a web page (or other page). The parameters may include at least one of a minimum time limit, a maximum time limit, a number of slides, an amount of text per slide, a number of slides, a minimum amount of time per slide, a maximum amount of time per slide, an amount of text in at least one slide, an amount of white space in at least one slide, a parameter based on imagery in at least one slide, a minimum speaking speed, a maximum speaking speed, whether bullet points on the presentation slides were covered, whether bullet points on the presentation slides were skipped, a factual accuracy (e.g., as verified based on a source of truth specified via the host device) of the content of the trial presentation, or a factual accuracy of the content of the slides.

The parameters, along with contact information (e.g., email addresses or user identifiers in a video conferencing application) of the presenters, are transmitted to a server. The server prompts each presenter to use their presenter device to transmit, to the server, their presentation slides and indicia of a trial performance of their presentations. The indicia of the trial performance may include, for example, a recording of a trial performance or a live trial performance conducted while the presenter device is connected to the server. The live trial performance may be recorded (e.g., for future analysis by the server to verify compliance with the parameters) or may be analyzed by the server in real-time. If the live trial performance is recorded, the user of the participant device is notified of the recording, and may request that the recording be removed from the server at any time (e.g., before or after the analysis of the recording by the server). In some cases, the recording is not used to train the server. The artificial intelligence at the server may be trained using other data, as described in greater detail further in this document.

The server uses artificial intelligence techniques to verify that the presentation slides and/or the indicia of the trial performance meet the parameters. For example, the server may leverage a language model (e.g., a large language model (LLM) or a generative pre-trained transformer-based language model) to process text in the presentation slides and/or natural language audio in the trial performance. Alternatively, other natural language processing techniques may be used in addition to or in place of the language model. In addition, the server may leverage a computer vision engine to process imagery in the presentation slides and/or camera-generated imagery in the trial performance. If the server determines that the presentation slides and/or the trial performance meet the parameters, the server notifies the host device and the presenter device that the presentation is acceptable. If the server determines that the presentation slides and/or the trial performance do not meet the parameters, the server uses the language model to generate a natural language output instructing the presenter how to modify the presentation slides and/or improve the trial presentation to meet the parameters.

In some examples of the present disclosure, implementations may include or otherwise use one or more artificial intelligence or machine learning (collectively, AI/ML) systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

To describe some implementations in greater detail, reference is first made to examples of hardware and software structures used to implement a system for verifying compliance of a video conference presentation with specified parameters. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the clients 104A through 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients

104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
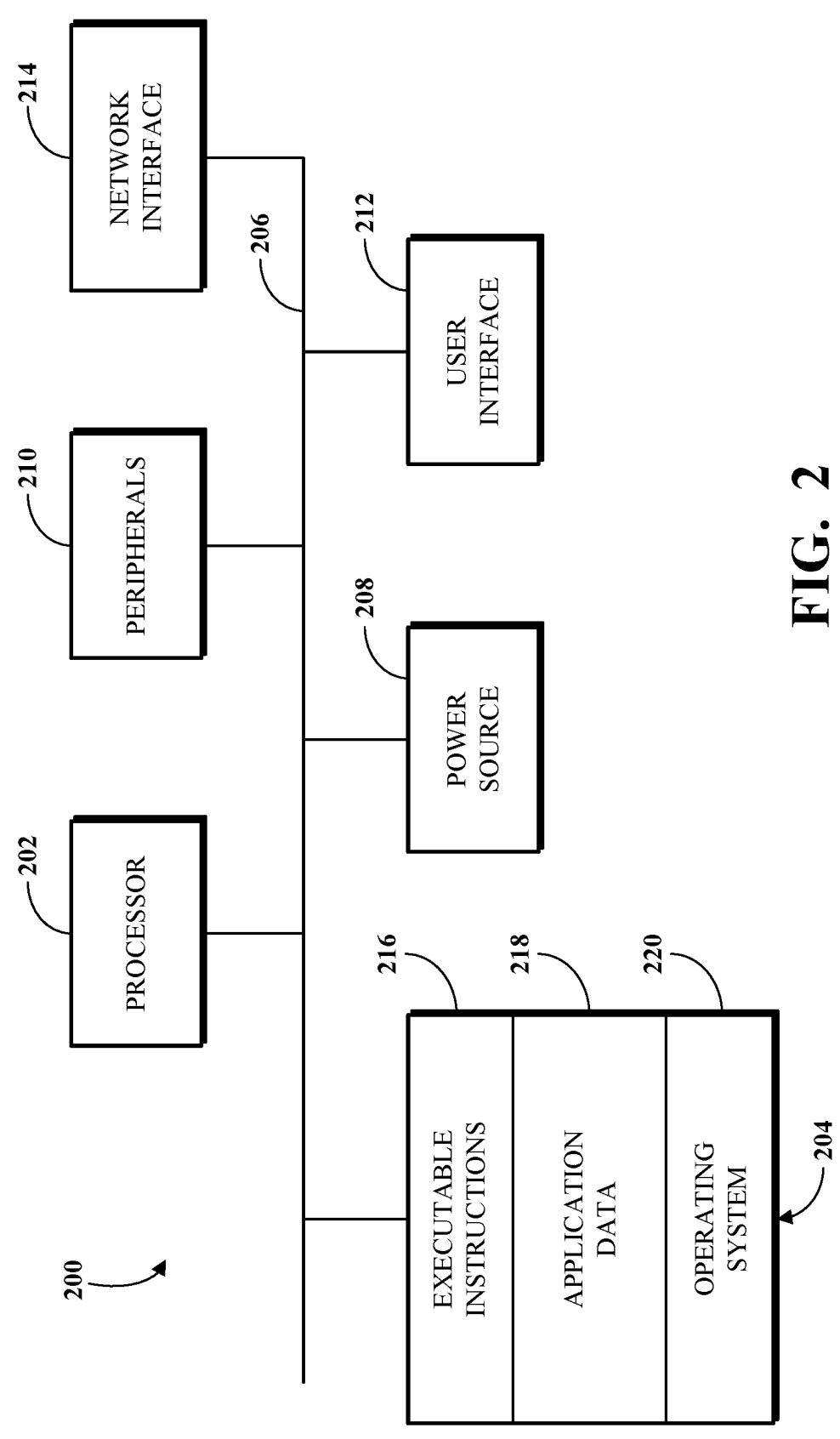
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
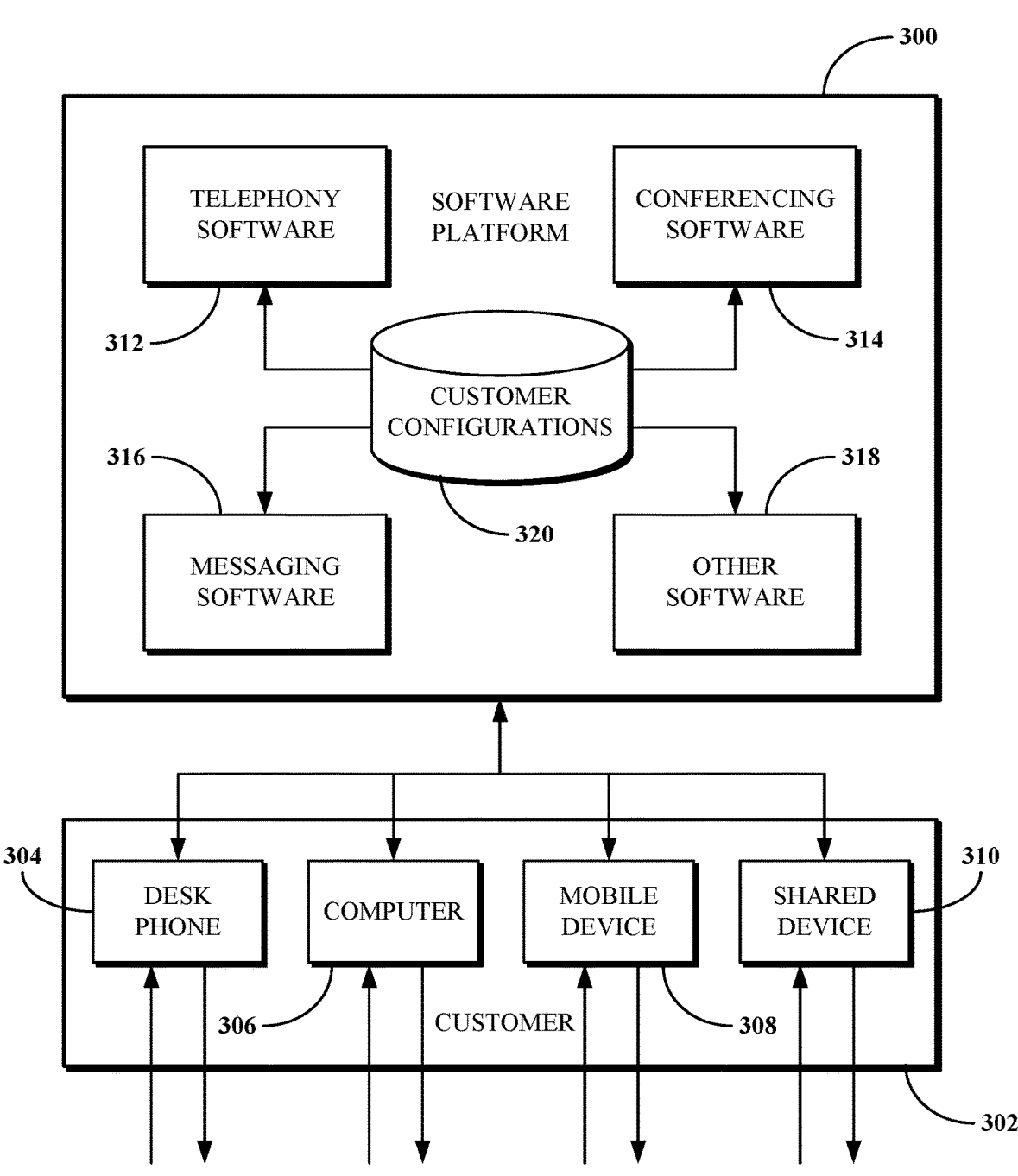
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients (e.g., the desk phone 304, the computer 306, the mobile device 308, and the shared device 310) includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices. (e.g., the desk phone 304, the computer 306, the mobile device 308, and the shared device 310)

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for verifying compliance of a video conference presentation with specified parameters. In some such cases, the conferencing software 314 may include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
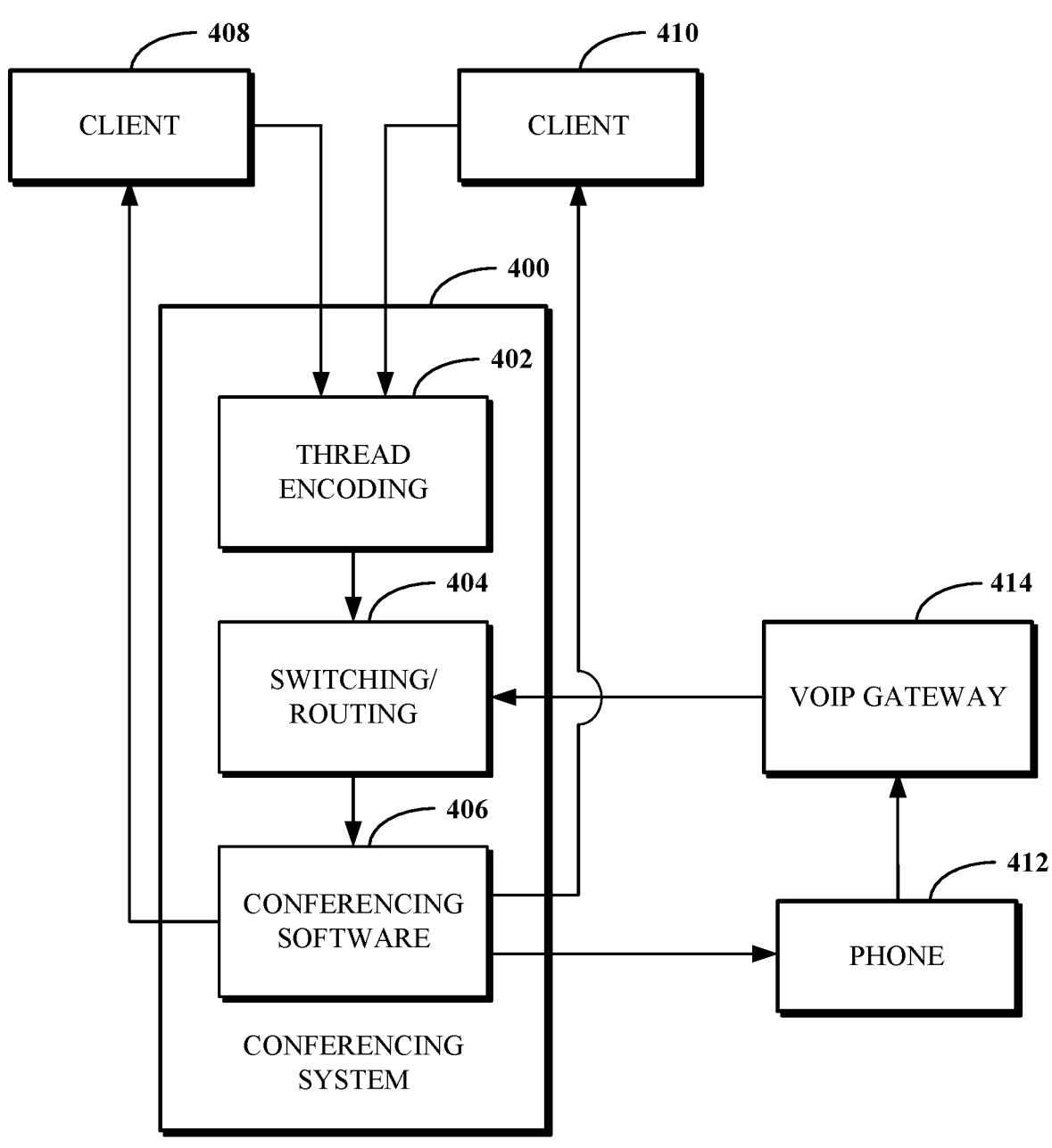
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, be the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406.

The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
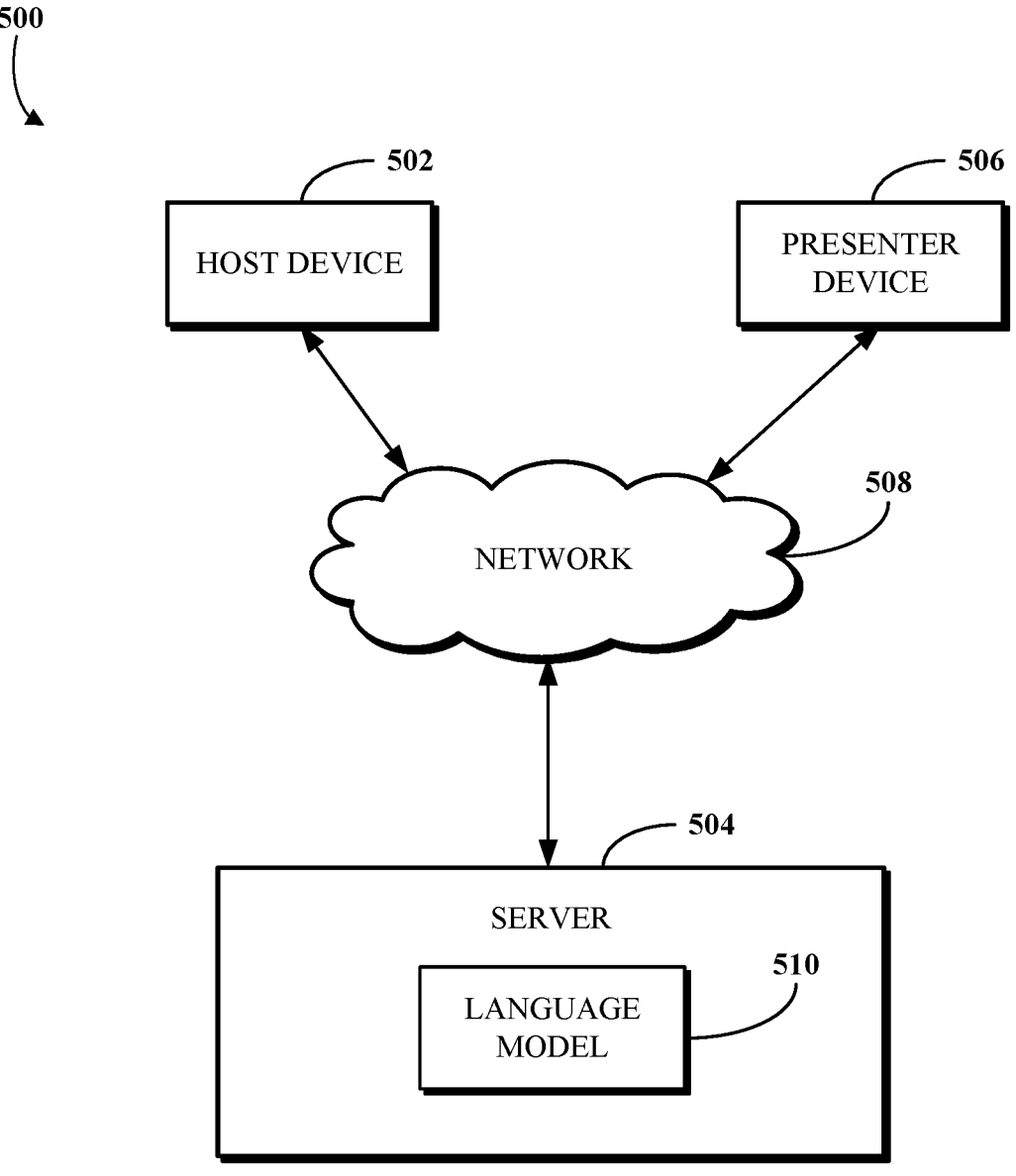
FIG. 5 is a block diagram of an example of a video conferencing system.

FIG. 5 is a block diagram of an example of a video conferencing system 500. As shown, the video conferencing system 500 includes a host device 502, a server 504, and a presenter device 506 connected to one another via a network 508. The network 508 may correspond to the network 114. The host device 502 and/or the presenter device 506 may correspond to at least one of the clients 104A-D, 304-310, or 408-410. The server 504 may correspond to at least one of the application server 108, a server of the software platform 300, or a server of the conferencing system 400.

As illustrated, the server 504 includes a language model 510. The language model 510 may be any natural language processing engine, for example, a large language model (LLM) or a generative pretrained transformer (GPT) engine. The language model 510 may be trained based on publicly available data on the Internet, such as newspaper articles, public blog posts, public social media posts, and publicly available audio or video recordings at webpages or web services that host such content. According to some implementations, the language model 510 might not be trained using video conferences or audio conferences conducted using the video conferencing or audio conferencing service described herein, unless recordings of those video conferences or audio conferences are made available to the public (e.g., via a web service that publishes audio or video content for public access). More details about the training of the language model 510 and inference using the language model 510 are provided below.

According to some implementations, the host device 502 uses an application or a webpage associated with the server 504 to create a video conference (or, alternatively, an audio conference or another type of conference). Using the application or the webpage, a user of the host device 502 specifies that an identifier (e.g., at least one of a user identifier, an email address, a device identifier, or an Internet Protocol address) associated with the presenter device 506 is to present in the video conference. The host device 502 also provides (e.g., by user input to the application or the webpage) parameters for the video conference. The parameters may include parameters related to the slide presentation, for example, at least one of a minimum time limit, a maximum time limit, a number of slides, an amount of text in at least one slide, an amount of white space in the at least one slide, a parameter based on imagery in the at least one slide, a minimum amount of time per slide, or a maximum amount of time per slide. The parameters may include parameters related to the oral presentation, for example, at least one of a minimum speaking speed, a maximum speaking speed, whether bullet points on the presentation slides were covered, whether bullet points on the presentation slides were skipped, a factual accuracy of the content of the trial presentation, or a factual accuracy of the content of the slides.

In response to the input from the host device 502 specified above, the server 504 prompts (e.g., via email, instant message or push notification provided to the presenter device 506) a user of the presenter device 506 to provide at least one of the presentation slides for the video conference or indicia of a trial performance of a presentation for the video conference. The indicia may include at least one of a recording of the trial performance or a live version of the trial performance generated while the presenter device 506 is connected to the server 504 via the network 508 and running an application or accessing a webpage associated with the server 504.

The server 504 uses the language model 510 to determine whether the presentation slides and/or the indicia of the trial performance meet the parameters. If the parameters are met, the server 504 provides, to the host device 502 and/or to the presenter device 506, a message indicating that the presentation of the presenter device 506 meets the parameters. If the parameters are not met, the server 504 provides, to the host device 502 and/or to the presenter device 506, a message indicating that the presentation does not meet the parameters. In some cases, the language model 510 generates feedback for the user of the presenter device 506 to modify the presentation to meet the parameters, and such feedback is transmitted to the presenter device 506. If the user of the presenter device 506 provides a predetermined number (e.g., four or five) of presentation slides and/or trial performances, and the parameters are never met, the server 504 may provide, to the host device 502 and/or to the presenter device 506, a message stating that the user of the presenter device 506 is having difficulty complying with the parameters. As a result, the user of the host device 502 may modify the parameters, assist the user of the presenter device 506 with revising their presentation to comply with the parameters, and/or appoint a different presenter (at a different presenter device) who is capable of complying with the parameters to present in the video conference.

As a result of some implementations of the disclosed technology, a host of a video conference is able to ensure compliance with parameters specified by the host without spending an excessive amount of time reviewing the presentation slides and/or trial performances of the presentation. Compliance with the parameters may ensure that the features and/or the qualities of the presentation meet criteria specified by the host. For example, compliance with the parameters may ensure that a video conference with multiple presenters is able to be performed within preset time limits, reducing the probability of the video conference significantly exceeding or falling below the time limits.

In some cases, the language model 510 includes a GPT engine that is trained using a two-phase process including the phases of pretraining and finetuning. In the pretraining phase, the GPT engine is trained on a corpus of publicly available (e.g., from the Internet) text or audio/video data that is converted into text using speech-to-text technology. The corpus of publicly available text may include text that is distinct from video conference recordings. For example, the corpus of publicly available text may include at least one of newspaper articles, blog posts, publicly available social media post, or encyclopedia articles. The text is used to create a language model that learns to predict the next word in a sentence given the context of the previous words. The Transformer architecture, specifically the self-attention mechanism, is used to capture dependencies between words and create a representation of the text.

During pretraining, the GPT engine learns to generalize the patterns it observes in the training data. Specifically, the GPT engine learns grammar, facts, reasoning abilities, and some level of world knowledge. The pretraining phase allows the GPT engine to acquire a broad understanding of the natural languages in which the GPT engine is trained.

During the finetuning phase, after pre-training, the GPT engine is further finetuned on specific tasks (e.g., interpreting compliance of presentation slides and/or presentation trial performances with parameters) using labeled examples. The labeled examples may include publicly-available videos and/or publicly-available slides which are labeled (e.g., by employees or contractors of a business associated with the server 504) as having or lacking certain features (e.g., discusses each bullet point on the slides, is factually accurate based on a specified source-of-truth). The finetuning phase makes the GPT engine useful for specific applications, such as determining compliance of presentation slides and/or presentation trial performances with parameters. Finetuning involves training the GPT engine on a narrower dataset that may be generated with the help of human reviewers.

The finetuning phase includes providing prompts or instructions to the GPT engine and receiving responses from the GPT engine. For example, a human reviewer may generate a set of parameters, a set of presentation slides, and a trial performance and provide these items to the GPT engine. The human reviewers then review the output generated by the GPT engine and score the output according to the various qualities (e.g., did the GPT engine correctly identify which parameters were or were not met, did the GPT engine provide relevant suggestions for revising the presentation slides or the trial performance to meet the parameters that were not met). The GPT engine uses reinforcement learning to attempt to improve its scores on each (or at least a subset) of the qualities as the finetuning process progresses.

Figure 6:
FIG. 6 is a data flow diagram of an example of verifying compliance of a video conference presentation with specified parameters.

FIG. 6 is a data flow diagram of an example of verifying compliance 600 of a video conference presentation with specified parameters. As shown, verifying the compliance 600 is performed using the host device 502, the server 504, and the presenter device 506 of FIG. 5.

At 602, the host device 502 receives a user input of conference information ("info"), presenter device information, and parameters, and transmits the received user input to the server 504. The conference information may include for example, a title of a conference, a start time of the conference, a time duration of the conference, and media (e.g., at least one of audio, video, or screensharing) for the conference. The presenter device information identifies one or more presenter devices (or user identifiers or accounts associated with presenter devices) for the conference. The parameters include any parameters associated with the presentation slides or the presentation trial performance with which the server 504 may verify compliance (e.g., using the language model 510). The parameters may include rule-based parameters and AI/ML-based parameters. The rule-based parameters may include, for example, each slide including black text and a white background, the text being in Times New Roman font, each slide including at least one image, and the presentation trial performance lasting between 14 and 16 minutes. The AI/ML-based parameters may include, for example, the information in the presentation slides or the information presented during the trial presentation conforming to a predefined source of truth (e.g., information in an online encyclopedia or information confirmed by a government agency), the presentation being in English, or each bullet point in a slide being discussed in the oral presentation. Compliance with the rule-based parameters may be verified by the server 504 without use of the language model 510. Compliance with the AI/ML-based parameters may be verified by the server 504 using the language model 510 or another AI/ML model.

In response to receiving the presenter device information, the server 504 prompts a user of the presenter device 506 (e.g., by transmitting a message, such as an email message, an instant message, or a push notification) to provide the presentation slides and indicia of a presentation trial performance to the server 504. At 604, the presenter device 506 transmits the presentation slides to the server 504. The presentation slides may be uploaded to the server 504 via an application (e.g., a conferencing application) or a webpage associated with the server 504. At 606, the presenter device 506 provides indicia of a presentation trial performance to the server 504. For example, the user of the presenter device 506 may record a video of the presentation trial performance and upload it to the server 504. Alternatively, the user of the presenter device 506 may conduct the presentation trial performance while connected to the server 504 (e.g., via the application or the webpage).

The presentation slides and/or the recording of the presentation trial performance may be, at least temporarily, stored at the server 504 for analysis thereat. The user of the presenter device 506 may be notified, via the presenter device 506, of this storage and is able (e.g., via a graphical user interface (GUI) presented at the presenter device) to cause the server 504 to delete the presentation sides and/or the recording at any time, either before or after the analysis of these data is completed by the server 504. The presentation slides and the recording are not stored at the server 504 without the consent of the user of the presenter device 506 and the user of the presenter device 506 is notified that the data provided to the server may be analyzed using rule-based, AI/ML, and/or other computing techniques.

At 608, the server 504 determines whether the presentation slides (provided by the presenter device 506 at 604) and the presentation trial performance (provided by the presenter device 506 at 606) meet the parameters (provided by the host device 502 at 602). If so, the server 504 transmits, to the host device 502 and the presenter device 506, a message indicating that the presentation slides and the presentation trial performance meet the parameters. If not, the server 504 transmits, to the host device 502 and the presenter device 506, a message indicating that the presentation slides or the presentation trial performance do not meet the parameters. The message to the presenter device 506 indicates which parameters were not met and may include suggestions, generated by the language model 510 of the server 504, for revising the presentation slides and/or the presentation trial performance to comply with the parameters.

In an example use case of the technology, a presentation hosts desires to set up a video conference with a presentation about consumer packaged goods (CPG) sales of a CPG company. The video conference presentation about the CPG sales is to last around 30 minutes and is to be attended by executives of the CPG company, some of whom are based outside of English speaking countries and are not native speakers of English. In order to set up the video conference, the presentation host uses a mobile device to access the interface shown in FIG. 7. In alternative implementations, the interface shown in FIG. 7 (or a similar interface) may be accessed on a computing device that is not a mobile device.

Figure 7:
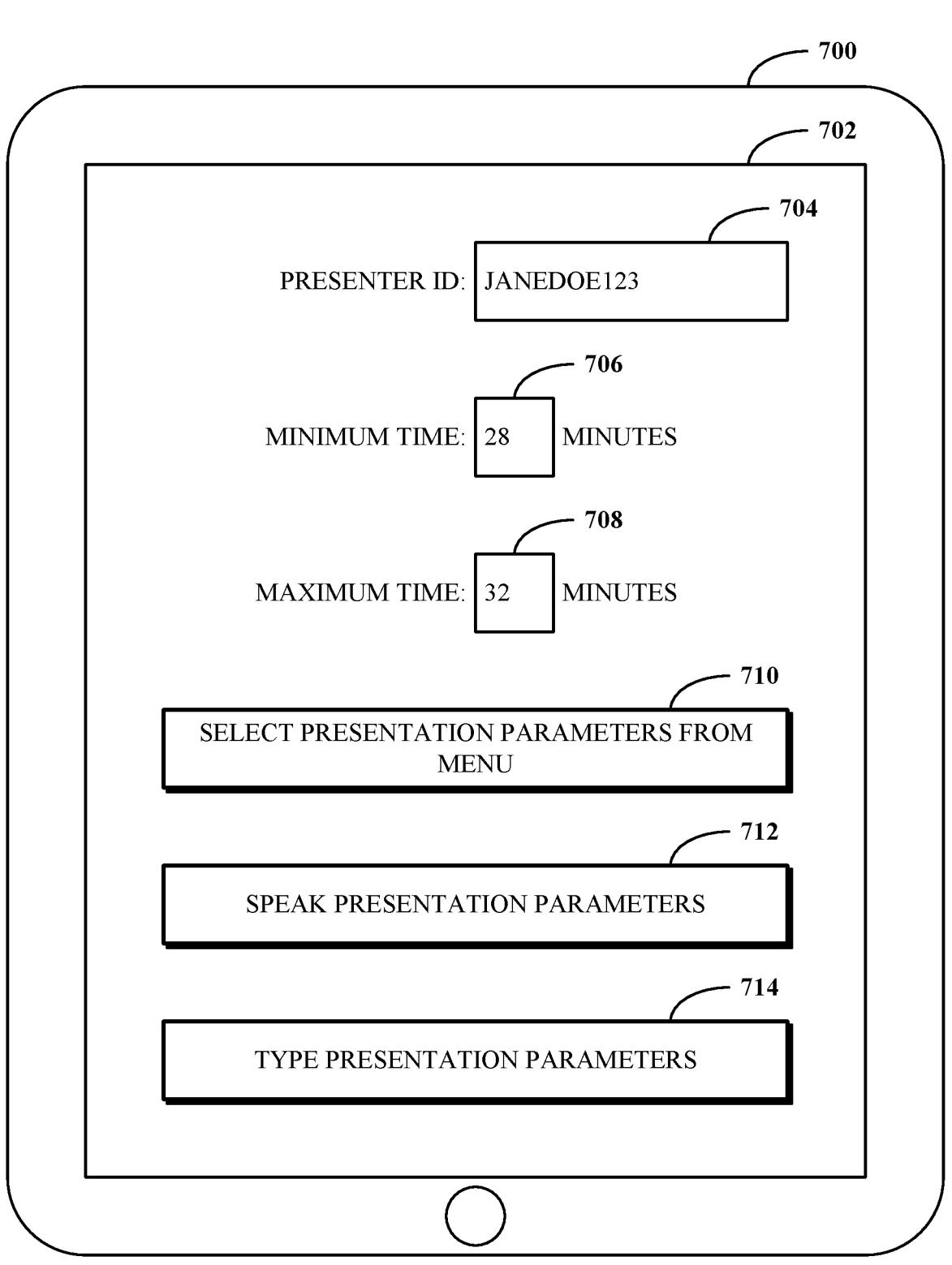
FIG. 7 illustrates an example mobile device presenting a graphical user interface for inputting parameters for a video conference presentation.

FIG. 7 illustrates an example mobile device 700 presenting a GUI 702 for inputting parameters for a video conference presentation. The mobile device 700 may be operated by the presentation host and may correspond to the host device 502. As shown, the GUI 702 includes an input box 704 for specifying a presenter ID of a presenter who will present the presentation about the CPG sales. As shown, the presentation host has specified that the presenter ID "jane-doe123" is to present. The presenter ID "janedoe123" may be associated with a presenter device (or alternatively multiple presenter devices or an account that is operated via one or more presenter devices). The GUI 702 further includes an input box 706 for specifying a minimum time for the presentation and an input box 706 for specifying a maximum time for the presentation. As shown, the presentation host has specified that the presentation of "janedoe123" is to last between 28 and 32 minutes.

The GUI 702 further includes a button 710 for selecting presentation parameters via a menu, a button 712 for speaking the presentation parameters, and a button 714 for typing the presentation parameters. Upon selection of the button 710, the mobile device 700 presents a menu of multiple presentation parameters as described herein. The user of the mobile device 700 may specify (e.g., by typing, selecting radio buttons, or dragging a slider) ranges of values for the parameters in the menu. Upon selection of the button 712, the mobile device 700 allows the user to speak the presentation parameters. The speech of the user is recorded and transmitted to the server 504. At the server 504, the language model 510 (or another language model) is used to interpret the speech of the user and to identify the presentation parameters from the speech. The user is then able to approve or modify the identified parameters via the user interface of the mobile device 700. Upon selection of the button 714, the mobile device 700 allows the user to type the presentation parameters. The text typed by the user is transmitted to the server 504. At the server 504, the language model 510 (or another language model) is used to interpret the text and to identify the presentation parameters from the text. The user is then able to approve or modify the identified parameters via the user interface of the mobile device 700.

It should be noted that, while the GUI 702 allows for only one presenter ID to be entered for one presentation, in alternative implementations, a video conference may include multiple presentations with multiple presenters. For example, instead of including a single presentation about CPG sales, the video conference described above could include a first presentation about CPG sales and a second presentation about CPG input costs.

In accordance with the example use case, the user of the mobile device 700 selects the button 712 to speak the presentation parameters. After selecting the button 712 and initiating the recording, the user speaks the following: "The presentation should begin with a title slide with the company logo. Each slide of the presentation should not exceed 50% white space. Each bullet point of each slide should be discussed in the oral presentation. Any graphs in the slides should be discussed orally, and the oral discussion should be mathematically and logically consistent with the graph imagery. The presenter should speak below 135 words per minute, as the presentation will be attended by viewers who are not native speakers of English." It should be noted that these parameters are in addition to the time parameters entered via the input box 706 and the input box 708.

The recording of the user speaking is transmitted to the server 504. The language model 510 of the server 504 is used to identify parameters corresponding to the recording. The following parameters are identified: "Slide 1 of the presentation is to be a title slide with the company logo," "Each slide is not to exceed 50% white space," "Each bullet point of each slide is to be discussed orally," "Each graph is to be discussed orally," "The oral discussion of each graph is to accurately correspond to the graph imagery," and "The presenter is to speak below 135 words per minute."

The identified parameters are presented, via the mobile device 700, to the user of the mobile device 700. The user of the mobile device 700 approves the identified parameters. After the identified parameters are approved, the server 504 transmits, to a device or a messaging address associated with the user "janedoe123," a message indicating that "jane-doe123" is to present in the video conference. The message requests that "janedoe123" upload her presentation slides to the server 504 and conduct a trial performance of the presentation using the presenter device 506 that is connected to the server 504. "Janedoe123" uses the presenter device 506 to create the presentation slides and uploads the presentation slides to the server 504. "Janedoe123" also conducts a trial performance of the presentation using the presenter device 506 while the presenter device 506 is connected to the server 504. The trial performance lasts 30 minutes and 53 seconds, placing it within the 28-32 minute range specified by the mobile device 700 of the presentation host via the GUI 702. The presentation slides and the recording of the trial performance of the presentation are provided to the language model 510 (and/or other software at the server 504) for processing.

The server 504 verifies that the trial presentation is completed within the allotted time range (28-32 minutes). Furthermore, the language model 510 of the server 504 processes the presentation slides and the trial performance to determine whether the presentation slides and the trial performance meet the identified parameters. As described in this example, the presentation slides and the trial performance recording are processed together. In alternative implementations, the presentation slides may be processed first and, after approval of the presentation slides, the trial performance may be requested for processing. After processing the presentation slides and the trail parameters, the server 504 generates the output shown in FIG. 8, which is presented at the presenter device 506 of "janedoe123."

FIG. 8 illustrates an example mobile device 800 presenting a GUI 802 indicating noncompliance of a video conference presentation with specified parameters. The mobile device 800 may correspond to the presenter device 506 of "janedoe123." In alternative implementations, the presenter device 506 may be a computing device that is not a mobile device. As shown, the GUI 802 includes text based on the parameters that were not met by the presentation slides and the trial performance. The GUI 802 further includes text indicating how the presentation slides and/or the trial performance may be adjusted to comply with the parameters.

For example, the server 504 determines that the parameter, "Slide 1 of the presentation is to be a title slide with the company logo," was not met. Thus, the GUI 802 includes the text: "Please include a title slide with the company logo."

The server 504 determines that the parameter, "Each slide is not to exceed 50% white space," was not met by some of the slides. Thus, the GUI 802 includes the text: "Please reduce the amount of white space in your slides. Slides #2, #6, and #9 exceed 50% white space.

The server 504 determines that the parameter, "Each bullet point of each slide is to be discussed orally," was not met for one of the bullet points. Thes, the GUI 802 includes the text: "In your oral presentation, please discuss the "increasing sales by outreach to minority groups" bullet point in slide #7."

The server 504 determines that the parameter, "The oral discussion of each graph is to accurately correspond to the graph imagery," was not met for one of the graphs. Thus, the GUI 802 includes the text: "In your oral discussion of slide #8, you mentioned that sales in 2022 exceeded sales in 2021. However, the graph in slide #8 illustrates the opposite."

The server 504 determines that the parameter, "The presenter is to speak below 135 words per minute," was not met. Thus, the GUI 802 includes the text: "Please speak more slowly (below 135 words per minute), as the presentation will be attended by viewers who are not native speakers of English. You were speaking at 164 words per minute."

As shown, the GUI 802 is presented on the mobile device 800. In alternative implementations, the GUI 802 may be transmitted via email, instant message, or another messaging technique. Furthermore, the GUI 802 is described and illustrated as including text. In alternative implementations, the GUI 802 may include at least one of an image, a video, or an audio recording.

The user associated with "janedoe123" reviews the GUI 802, adjusts the presentation slides based on the GUI 802, and conducts another trial performance of the presentation while connected to the server 504 incorporating the feedback in the GUI 802. The server 504 uses the language model 510 to reprocess the updated presentation slides and the updated trial performance. The server 504 determines that the updated presentation slides and the updated trial performance comply with all of the parameters specified by the mobile device 700 of FIG. 7. As a result, the server 504 causes the presenter device 506 of "janedoe123" to present the output illustrated in FIG. 9.

Figure 9:
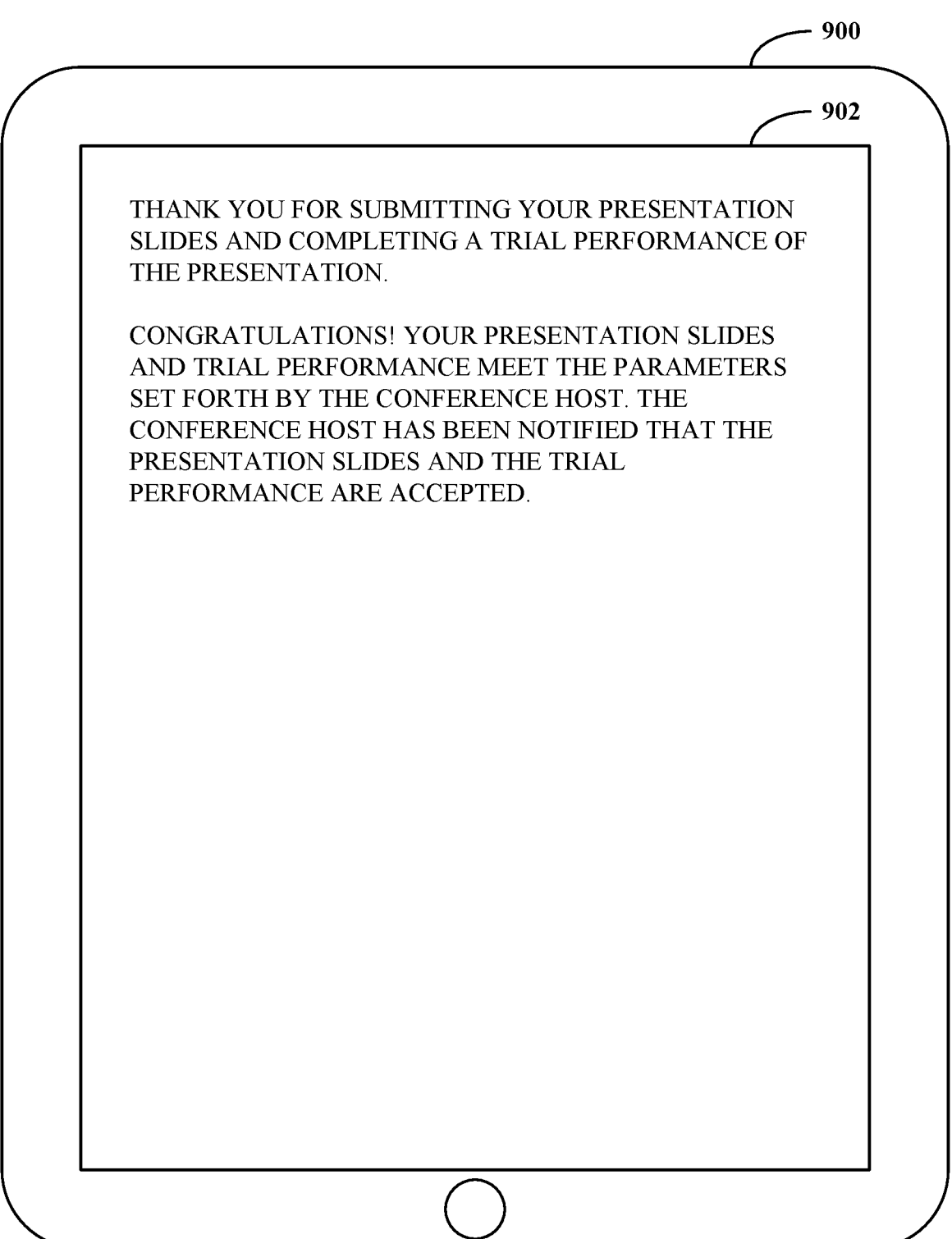
FIG. 9 illustrates an example mobile device presenting a graphical user interface indicating compliance of a video conference presentation with specified parameters.

FIG. 9 illustrates an example mobile device 900 presenting a GUI 902 indicating compliance of a video conference presentation with specified parameters. The mobile device 900 may correspond to the presenter device 506 of "janedoe123." The mobile device 900 may be the same device as the mobile device 800, depicted at a different time. As illustrated, the GUI 902 indicates that the presentation slides and the trial performance of the presentation meet the parameters set forth by the host device 502 (e.g., using the GUI 702 of FIG. 7). After the server 504 (e.g., using the language model 510) confirms that the presentation slides and the trail performance meet the parameters, the presenter device receives a notification as illustrated in FIG. 9. In alternative implementations, the notification may be transmitted using messaging technology (e.g., email or instant messaging) instead of being displayed directly on the screen of the mobile device 900. In some cases, the host device 502 is also notified that the presentation slides and the trial performance meet the parameters. As shown, the GUI 902 includes text. In alternative implementations, the GUI 902 may include at least one of an image, a video, or an audio recording.

After the host device 502 and the presenter device 506 receive the notification that the presentation slides and the trial presentation meet the parameters indicated by the host device 502, "janedoe123" is approved to present in the video conference. As a result of the server 504 verifying that the presentation meets the parameters, the presentation runs smoothly and is completed in the allotted time.

The GUI 802 or the GUI 902 may be generated in real-time after receiving the corresponding presentation slides and trial performance indicia. This would provide the user of the presenter device 506 with real-time feedback on the data they provide to the server 504, resulting in an efficient user experience. Alternatively, the GUI 802 or the GUI 902 may be generated with some delay after receiving the corresponding presentation slides and trial performance indicia. For example, the server 504 may execute AI/ML software to generate the GUI 802 or the GUI 902 during a time when demand for resources at the server is low (e.g., during night or weekend hours). As a result, the server 504 may use its resources for other, more immediate processing needs during peak demand times (e.g., business hours) of the server 504.

To further describe some implementations in greater detail, reference is next made to examples of techniques which may be performed by or using a system for verifying compliance of a video conference presentation with specified parameters. FIG. 10 is a flowchart of an example of a technique 1000 for verifying compliance of a video conference presentation with specified parameters. The technique 1000 can be executed using computing devices, such as the systems, hardware, and software described with respect to FIGS. 1-9. The technique 1000 can be performed, for example, by executing a machine-readable program or other computer-executable instructions, such as routines, instructions, programs, or other code. The steps, or operations, of the technique 1000, or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations of the technique 1000 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, a server (e.g., the server 504) receives, from a host device (e.g., the host device 502) of a video conference, an identifier of a presenter device (e.g., the presenter device 506) of the video conference and parameters for the video conference. In response, the server transmits, to the presenter device, a message which causes the presenter device to prompt a user of the presenter device to upload presentation slides to the server and/or provide indicia of a trial performance of a presentation to the server. The indicia of the trial performance may be a recording of the trial performance or a live trail performance while connected to the server via a network (e.g., the network 508).

At 1004, the server receives, from the presenter device, at least one of the presentation slides for the video conference or the indicia of the trial performance of a presentation for the video conference. The presentation slides and/or the indicia of the trial performance may be provided to the server in response to the prompt. In some cases, the presentation slides and the indicia of the trial performance are provided to the server together and processed by the server in parallel. Alternatively, the server may first receive the presentation slides and may request the trial performance after the server has determined that the presentation slides meet the parameters.

At 1006, the server determines, using a language model (e.g., the language model 510), whether the at least one of the presentation slides or the indicia of the trial performance meet the parameters. For example, the server may verify, using the language model, whether text in the presentation slides meets the parameters. The server may verify, using the language model, whether natural language audio in the trial performance meets the parameters.

The server may verify, using a computer vision engine at the server, whether camera-generated imagery in the trial performance meets the parameters (e.g., whether the user of the presenter device is dressed appropriately, has an appropriate facial expression, or has appropriate hair styling). The computer vision engine may transmit data to the language model for further processing by the language model. For example, if the parameters state that the presenter should be wearing business formal attire, but the presenter is wearing a t-shirt during the trial presentation, the computer vision engine may transmit this information to the language model. The language model may generate an output indicating that the trial presentation failed to meet the parameters as the presenter was not wearing business formal attire.

The computer vision engine may be trained to detect visual data using computer vision techniques. In some examples, the computer vision engine is trained to recognize objects in images using supervised learning. The training dataset includes a set of labeled images of various object (e.g., t-shirt, tie, jacket, table, or chair). Alternatively, other training techniques may be used.

The server may determine a background noise level in the trial performance using an audio processing engine residing at the server. The server may also determine an emotion corresponding to a voice tonality in the trial performance using the audio processing engine. The audio processing engine may transmit the determined background noise level or the determined voice tonality to the language model for verification of compliance with the specified parameters. For example, the server may determine, based on the parameters, that the trial performance includes too much background noise, and provide, to the presenter device, a notification to conduct another trial performance in a quieter location. The server may determine, based on the parameters, that the voice tonality does not meet the parameters. For example, the parameters may specify that the presentation is to be conducted using a serious voice tonality, while the presenter in the trial performance was determined, by the audio processing engine, to have a silly voice tonality.

The audio processing engine may be trained using any AI/ML training technique. In some examples, the audio processing engine is trained to detect background noise using a labeled dataset of publicly available speeches with different levels of background noise. The speeches are labeled to indicate the amount of background noise. The audio processing engine is trained to determine the voice tonality based on a labeled dataset of recordings of people speaking with various voice tonalities (e.g., at least one of serious, silly, happy, sad, angry, frustrated, tired, or bored). The labeled dataset includes a label of the voice tonality, as well as a degree to which the voice tonality is expressed (e.g., slightly tired, or very tired).

At 1008, the server transmits, to at least one of the host device or the presenter device, an output based on whether the at least one of the presentation slides or the indicia of the trial performance meet the parameters. If the presentation slides and/or the indicia of the trial performance meet the parameters, the output indicates approval of the presentation slides and/or the trial performance for the video conference. If the presentation slides and/or the indicia of the trial performance do not meet the parameters, the output indicates that revisions or modifications (to the presentation slides and/or the trial performance) might be useful before performing the presentation at the video conference. The output may include at least one of a proposed revision to the presentation slides or a proposed modification of the trial performance. The proposed revision and/or the proposed modification may be generated using the language model.

As used herein, meeting the parameters may include meeting any and all of the parameters or meeting at least a subset of the parameters. In some cases, compliance with some of the parameters might not be verified. For example, one of the parameters might state that the presentation slides and the oral statements in the trial performance should be historically accurate. However, if the presentation slides state, incorrectly, that the United States Civil War ended in 1965 (the United States Civil War really ended in 1865), the server might not be able to verify that this statement is incorrect if the server does not have access to a source of truth, for example, due to a source of truth not being specified or the source of truth being unavailable (e.g., due to network issues). In this case, the server might still verify compliance of the presentation slides and/or the indicia of the trial performance with other parameters provided by the host of the video conference.

Alternatively, compliance with some parameters might not be verified if verifying compliance with the parameters is not within the capabilities of the server (e.g., due to limitations of the artificial intelligence of the server). For example, the presentation host may specify, in one of the parameters, that the voice tonality of the speaker during the oral presentation should express schadenfreude. The server might be unable to verify the compliance with this parameter due to a lack of artificial intelligence that is capable of identifying voice tonality expressing schadenfreude. In some cases, the server outputs, to the presenter device and/or to the host device, a list of the parameters with which compliance could not be verified by the server. For example, the output could state that the server was unable to verify the factual accuracy of the statement in the presentation slides that the United States Civil War ended in 1965, as well as the voice tonality of the speaker during the oral presentation being associated with schadenfreude.

Some implementations are described below as numbered examples (Example 1, 2, 3, etc.). These examples are provided as examples only and do not limit the other implementations disclosed herein.

Example 1 is a method, comprising: receiving, from a host device of a video conference, an identifier of a presenter device of the video conference and parameters for the video conference; receiving, from the presenter device, at least one of presentation slides for the video conference or indicia of a trial performance of a presentation for the video conference; determining, using a language model, whether the at least one of the presentation slides or the indicia of the trial performance meet at least a subset of the parameters; and transmitting, to at least one of the host device or the presenter device, an output based on whether the at least one of the presentation slides or the indicia of the trial performance meet the at least the subset of the parameters.

In Example 2, the subject matter of Example 1 includes, determining that the at least one of the presentation slides or the indicia of the trial performance meet the at least the subset of the parameters; and generating the output indicating approval of the presentation slides for the video conference.

In Example 3, the subject matter of Examples 1-2 includes, determining that the at least one of the presentation slides or the indicia of the trial performance do not meet the at least the subset of the parameters; and generating the output comprising at least one of: a proposed revision to the presentation slides or a proposed modification of the trial performance.

In Example 4, the subject matter of Examples 1-3 includes, wherein the parameters comprise at least one of: a minimum time limit, a maximum time limit, a number of slides, an amount of text in at least one slide, an amount of white space in the at least one slide, a parameter based on imagery in the at least one slide, a minimum amount of time per slide, or a maximum amount of time per slide.

In Example 5, the subject matter of Examples 1-4 includes, wherein the parameters comprise at least one of: a minimum speaking speed, a maximum speaking speed, whether bullet points on the presentation slides were covered, whether bullet points on the presentation slides were skipped, a factual accuracy of the content of the trial presentation, or a factual accuracy of the content of the slides.

In Example 6, the subject matter of Examples 1-5 includes, wherein determining whether the at least one of the presentation slides or the indicia of the trial performance meet the at least the subset of the parameters comprises: verifying, using the language model, whether text in the presentation slides meets the parameters; and verifying, using the language model, whether natural language audio in the indicia of the trial performance meets the parameters.

In Example 7, the subject matter of Examples 1-6 includes, wherein determining whether the at least one of the presentation slides or the indicia of the trial performance meet the at least the subset of the parameters comprises: verifying, using a computer vision engine, whether imagery in the presentation slides meets the parameters; verifying, using the computer vision engine, whether camera-generated imagery in the trial performance meets the parameters; and transmitting, by the computer vision engine, data indicating whether the imagery in the presentation slides or the camera-generated imagery meet the at least the subset of the parameters to the language model.

In Example 8, the subject matter of Examples 1-7 includes, wherein determining whether the at least one of the presentation slides or the indicia of the trial performance meet the at least the subset of the parameters comprises: determining, using an audio processing engine, a background noise level in the trial performance; and transmitting, by the audio processing engine, the determined background noise level to the language model.

In Example 9, the subject matter of Examples 1-8 includes, wherein determining whether the at least one of the presentation slides or the indicia of the trial performance meet the at least the subset of the parameters comprises: determining an emotion corresponding to a voice tonality in the trial performance using an audio processing engine of the server; and transmitting, by the audio processing engine, the determined emotion to the language model.

Example 10 is a non-transitory computer readable medium storing instructions operable to cause one or more processors to perform operations comprising: receiving, from a host device of a video conference, an identifier of a presenter device of the video conference and parameters for the video conference; receiving, from the presenter device, at least one of presentation slides for the video conference or indicia of a trial performance of a presentation for the video conference; determining, using a language model, whether the at least one of the presentation slides or the indicia of the trial performance meet at least a subset of the parameters; and transmitting, to at least one of the host device or the presenter device, an output based on whether the at least one of the presentation slides or the indicia of the trial performance meet the at least the subset of the parameters.

In Example 11, the subject matter of Example 10 includes, the operations comprising: determining that the at least one of the presentation slides or the indicia of the trial performance meet the at least the subset of the parameters; and generating the output comprising text indicating approval of the presentation slides for the video conference.

In Example 12, the subject matter of Examples 10-11 includes, the operations comprising: determining that the presentation slides do not meet the at least the subset of the parameters; and generating the output comprising a proposed revision to the presentation slides.

In Example 13, the subject matter of Examples 10-12 includes, wherein the parameters comprise at least one of: a time limit parameter, a number of slides, an amount of text in at least one slide, an amount of white space in the at least one slide, a parameter based on imagery in the at least one slide, a minimum amount of time per slide, or a maximum amount of time per slide.

In Example 14, the subject matter of Examples 10-13 includes, wherein the parameters comprise at least one of: a speaking speed parameter, whether bullet points on the presentation slides were covered, whether bullet points on the presentation slides were skipped, a factual accuracy of the content of the trial presentation, or a factual accuracy of the content of the slides.

In Example 15, the subject matter of Examples 10-14 includes, wherein determining whether the presentation slides meet the at least the subset of the parameters comprises: verifying, using the language model, whether text in the presentation slides meets the parameters.

In Example 16, the subject matter of Examples 10-15 includes, wherein determining whether the presentation slides meet the at least the subset of the parameters comprises: verifying, using a computer vision engine, whether imagery in the presentation slides meets the parameters; outputting, by the computer vision engine, data indicating whether the imagery in the presentation slides meets the parameters to the language model.

In Example 17, the subject matter of Examples 10-16 includes, wherein determining whether the at least one of the presentation slides or the indicia of the trial performance meet the at least the subset of the parameters comprises: determining, using an audio processing engine, a background noise level in the trial performance; and outputting, by the audio processing engine, the determined background noise level to the language model.

In Example 18, the subject matter of Examples 10-17 includes, wherein determining whether the at least one of the presentation slides or the indicia of the trial performance meet the at least the subset of the parameters comprises: determining an emotion corresponding to a voice tonality in the trial performance using an audio processing engine; and transmitting, by the audio processing engine, the determined emotion to the language model.

Example 19 is a system, comprising: a memory subsystem; and processing circuitry configured to execute instructions stored in the memory subsystem to: receive, from a host device of a video conference, an identifier of a presenter device of the video conference and parameters for the video conference; receive, from the presenter device, at least one of presentation slides for the video conference or indicia of a trial performance of a presentation for the video conference; determine, using a language model, whether the at least one of the presentation slides or the indicia of the trial performance meet at least a subset of the parameters; and transmit, to at least one of the host device or the presenter device, an output based on whether the at least one of the presentation slides or the indicia of the trial performance meet the at least the subset of the parameters.

In Example 20, the subject matter of Example 19 includes, the processing circuitry configured to execute the instructions stored in the memory subsystem to: determine that the indicia of the trial performance do not meet the at least the subset of the parameters; and generate the output comprising a proposed modification of the trial performance.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" or "model" may include software, hardware, or a combination of software and hardware. An engine or a model may be implemented using software stored in the memory subsystem. Alternatively, an engine or a model may be hard-wired into processing circuitry. In some cases, an engine or a model includes a combination of software stored in the memory subsystem and hardware that is hard-wired into the processing circuitry.

As used herein, the term "real-time" may include an event occurring without any intentional delay. Some delay may still occur, for example, due to latency in the processing circuitry, the network interface, the network, or other components. In the phrase, "a computer transmits a signal in real-time after the computer calculates a value," the signal may be transmitted 10 milliseconds, one second, one minute, one hour, or several hours after the value is calculated, as long as the delay is due to latency in the processing circuitry, the network interface, the network, or another component, and there is no intentional delay programmed into the software or hard-wired into the hardware of the computer.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
receiving, from a host device of a video conference, an identifier of a presenter device of the video conference and a natural language presentation parameter description;
interpreting, using one or more language models, the natural language presentation parameter description to identify parameters for the video conference, wherein the parameters identified include a slide content requirement and an oral presentation requirement;
receiving, from the presenter device, presentation slides for the video conference and indicia of a trial performance of a presentation for the video conference;
determining, using the one or more language models, whether the presentation slides and the indicia of the trial performance meet at least a subset of the parameters, the subset of the parameters including the slide content requirement and the oral presentation requirement; and
transmitting, to at least one of the host device or the presenter device, an output based on determining whether the presentation slides and the indicia of the trial performance meet the at least the subset of the parameters,
wherein the one or more language models include a pre-trained model that is finetuned using labeled examples of presentation slides or trial performances that are labeled as meeting or failing to meet one or more presentation parameters.

2. The method of claim 1, comprising:
determining that the presentation slides and the indicia of the trial performance meet the at least the subset of the parameters; and
generating the output indicating approval of the presentation slides for the video conference.

3. The method of claim 1, comprising:
determining that the presentation slides and the indicia of the trial performance do not meet the at least the subset of the parameters; and
generating, using the one or more language models, the output comprising a natural language output instructing a user of the presenter device how to modify at least one of: the presentation slides or the trial performance to meet the at least the subset of the parameters.

4. The method of claim 1, wherein the slide content requirement comprises at least one of a number of slides, an amount of text in at least one slide, an amount of white space in the at least one slide, a parameter based on imagery in the at least one slide, a minimum amount of time per slide, or a maximum amount of time per slide, and the oral presentation requirement comprises at least one of a minimum time limit, a maximum time limit, a minimum speaking speed, or a maximum speaking speed.

5. The method of claim 1, wherein determining whether the presentation slides and the indicia of the trial performance meet the at least the subset of the parameters comprises:
analyzing, using the one or more language models, whether text content from the presentation slides meets the subset of the parameters;
analyzing, using the one or more language models, whether natural language audio content from the indicia of the trial performance meets the subset of the parameters; and
determining, using the one or more language models, whether the natural language audio content from the indicia of the trial performance accurately corresponds to the text content from the presentation slides.

6. The method of claim 1, wherein the slide content requirement comprises a parameter requiring a specific object to be present in imagery of the presentation slides, and wherein determining whether the presentation slides and the indicia of the trial performance meet the at least the subset of the parameters comprises:
analyzing, using a computer vision engine that is trained to recognize objects in images, the imagery in the presentation slides to determine whether a recognized object meets the parameter requiring the specific object; and
transmitting, by the computer vision engine, data indicating whether the imagery in the presentation slides meets the parameter requiring the specific object to the one or more language models.

7. The method of claim 1, wherein determining whether the presentation slides and the indicia of the trial performance meet the at least the subset of the parameters comprises:
determining an emotion corresponding to a voice tonality in the trial performance using an audio processing engine; and
transmitting, by the audio processing engine, the emotion to the one or more language models.

8. The method of claim 1, wherein the natural language presentation parameter description comprises a recording of a user of the host device speaking, and identifying parameters for the video conference based on the natural language presentation parameter description further comprises interpreting speech in the recording to identify the parameters from the speech.

9. The method of claim 1, wherein the presentation slides include text elements, the oral presentation requirement comprises a requirement that each of the text elements is to be discussed in the trial performance, and determining whether the presentation slides and the indicia of the trial performance meet the at least a subset of the parameters further comprises determining, using the one or more language models, whether each of the text elements is discussed in the indicia of the trial performance.

10. The method of claim 1, wherein the slide content requirement comprises a requirement that factual content in the presentation slides and the indicia of the trial performance is to be accurate based on a specified source of truth, and determining whether the presentation slides and the indicia of the trial performance meet at least a subset of the parameters further comprises:

obtaining information from the specified source of truth over a network; and determining, using the one or more language models, whether the factual content in the presentation slides and the indicia of the trial performance is verified by the information obtained from the specified source of truth.

11. The method of claim 1, wherein the presentation slides include imagery and the indicia of the trial performance include natural language audio content, and wherein determining whether the presentation slides and the indicia of the trial performance meet the at least the subset of the parameters further comprises determining, using the one or more language models, whether the natural language audio content accurately corresponds to the imagery.

12. The method of claim 11, wherein the imagery comprises graph imagery, and wherein determining whether the natural language audio content accurately corresponds to the imagery further comprises determining, using the one or more language models, whether the natural language audio content accurately corresponds to the graph imagery.

13. The method of claim 1, wherein identifying parameters for the video conference based on the natural language presentation parameter description further comprises:

using the one or more language models to interpret the natural language presentation parameter description to generate suggested parameters;

causing presentation of the suggested parameters on a graphical user interface; and receiving a user input approving or modifying the suggested parameters to establish the parameters for the video conference.

14. A non-transitory computer readable medium storing instructions operable to cause one or more processors to perform operations comprising:

receiving, from a host device of a video conference, an identifier of a presenter device of the video conference and a natural language presentation parameter description;

interpreting, using one or more language models, the natural language presentation parameter description to identify parameters for the video conference, wherein the parameters identified include a slide content requirement and an oral presentation requirement;

receiving, from the presenter device, presentation slides for the video conference and indicia of a trial performance of a presentation for the video conference;

determining, using the one or more language models, whether the presentation slides and the indicia of the trial performance meet at least a subset of the parameters, the subset of the parameters including the slide content requirement and the oral presentation requirement; and transmitting, to at least one of the host device or the presenter device, an output based on determining whether the presentation slides and the indicia of the trial performance meet the at least the subset of the parameters, wherein the one or more language models include a pre-trained model that is finetuned using labeled examples of presentation slides or trial performances that are labeled as meeting or failing to meet one or more presentation parameters.

15. The non-transitory computer readable medium of claim 14, the operations comprising:

determining that the presentation slides and the indicia of the trial performance meet the at least the subset of the parameters; and generating the output comprising text indicating approval of the presentation slides for the video conference.

16. The non-transitory computer readable medium of claim 14, the operations comprising:

determining that the presentation slides and the indicia of the trial performance do not meet the at least the subset of the parameters; and generating, using the one or more language models, the output comprising a natural language output instructing a user of the presenter device how to modify at least one of: the presentation slides or the trial performance to meet the at least the subset of the parameters.

17. The non-transitory computer readable medium of claim 14, wherein the slide content requirement comprises a parameter requiring a specific object to be present in imagery of the presentation slides, and wherein determining whether the presentation slides meet the at least the subset of the parameters comprises:

analyzing, using a computer vision engine that is trained to recognize objects in images, the imagery in the presentation slides to determine whether a recognized object meets the parameter requiring the specific object; and transmitting, by the computer vision engine, data indicating whether the imagery in the presentation slides meets the parameter requiring the specific object to the one or more language models.

18. The non-transitory computer readable medium of claim 14, wherein determining whether the presentation slides and the indicia of the trial performance meet the at least the subset of the parameters comprises:

determining an emotion corresponding to a voice tonality in the trial performance using an audio processing engine; and transmitting, by the audio processing engine, the determined emotion to the one or more language models.

19. A system, comprising:

a memory subsystem; and processing circuitry configured to execute instructions stored in the memory subsystem to:

receive, from a host device of a video conference, an identifier of a presenter device of the video conference and a natural language presentation parameter description;

interpret, using one or more language models, the natural language presentation parameter description to identify parameters for the video conference, wherein the parameters identified include a slide content requirement and an oral presentation requirement;

receive, from the presenter device, presentation slides for the video conference and indicia of a trial performance of a presentation for the video conference;

determine, using the one or more language models, whether the presentation slides and the indicia of the trial performance meet at least a subset of the parameters, the subset of the parameters including the slide content requirement and the oral presentation requirement; and transmit, to at least one of the host device or the presenter device, an output based on determining whether the presentation slides and the indicia of the trial performance meet the at least the subset of the parameters, wherein the one or more language models include a pre-trained model that is finetuned using labeled examples of presentation slides or trial performances that are labeled as meeting or failing to meet one or more presentation parameters.

20. The system of claim 19, the processing circuitry configured to execute the instructions stored in the memory subsystem to:

determine that the presentation slides and the indicia of the trial performance do not meet the at least the subset of the parameters; and generate, using the one or more language models, the output comprising a natural language output instructing a user of the presenter device how to modify at least one of: the presentation slides or the trial performance to meet the at least the subset of the parameters.

* * * * *